United States Patent [19]

Lamb

[11] 3,873,854

[45] Mar. 25, 1975

[54] CIRCUIT FOR PREVENTING FALSE TURN ON OF ELECTRONIC SWITCHES OR THE LIKE

[75] Inventor: John T. Lamb, Mansfield, Ohio

[73] Assignee: The Tappan Company, Mansfield, Ohio

[22] Filed: Nov. 27, 1973

[21] Appl. No.: 419,270

[52] U.S. Cl. .......... 307/252 N, 307/202, 307/252 B, 323/235 C, 323/24

[51] Int. Cl. .. H03k 17/72, H03k 17/66, H02h 9/02, H02h 9/04

[58] Field of Search ............ 307/202, 252 B, 252 N, 307/252 P, 252 Q, 252 T, 252 UA, 252 W, 284, 305; 328/9; 323/235 C, 24

[56] References Cited

UNITED STATES PATENTS

| | | | |
|---|---|---|---|
| 3,414,738 | 12/1968 | Gilbreath | 307/284 X |
| 3,489,927 | 1/1970 | Kelley, Jr. et al. | 307/252 N |
| 3,624,412 | 11/1970 | Nishimura | 307/252 B |
| 3,644,755 | 2/1972 | Shaw | 307/252 Q X |
| 3,740,585 | 6/1973 | Squiers | 307/252 B |

FOREIGN PATENTS OR APPLICATIONS

| | | | |
|---|---|---|---|
| 1,223,451 | 8/1966 | Germany | 307/202 |

OTHER PUBLICATIONS

Farel et al., "Triac AC Contactor," IBM Tech. Discl. Bull.; vol. 13, No. 8, pp. 2277; 1/1971.

Buczynski, "Triggerless Phase Control Circuit Sensitive Gate Triacs," RCA Tech. Notes, TN No. 715, 6/1967, Sheets 1 and 2 of 2.

*Primary Examiner*—Martin H. Edlow
*Assistant Examiner*—L. N. Anagnos
*Attorney, Agent, or Firm*—Donnelly, Maky, Renner & Otto

[57] ABSTRACT

A controlled electronic switch is coupled in series with a load for controlling power to the latter when a main switch is closed to provide a connection to an AC power supply, and an adjustable trigger circuit determines conduction in the controlled switch. Moreover, a shunt resistance is coupled in parallel with the main switch to apply full voltage to the controlled switch when the main switch is open, thus eliminating any sudden voltage transient to the controlled switch when the main switch is closed to a conductive state. The shunt resistance provides sufficient leakage current to the controlled switch to maintain line voltage thereacross although such leakage current is not adequate to operate the load.

11 Claims, 2 Drawing Figures

CIRCUIT FOR PREVENTING FALSE TURN ON OF ELECTRONIC SWITCHES OR THE LIKE

BACKGROUND OF THE INVENTION

This invention relates to a circuit for eliminating false turn on of an electronic controlled switch and more particularly to such a circuit for eliminating false SCR or triac turn on due to *dv/dt* firing thereof when full voltage is applied.

Conventional silicon controlled rectifier (SCR) or triac control circuits for regulating power applied to a load normally include a trigger circuit for supplying a firing or trigger signal to the SCR or triac to achieve conduction therein completing a current path through the load when AC power is provided thereto, for example, through a closed main switch. Usually, the trigger circuit is adjustable to retard or advance the angle or time in alternate half cycles for the SCR or in each half cycle for the triac at which such device becomes conductive, whereby average power to the load is controlled by varying of the trigger signal.

A drawback to such control circuits utilizing electronic controlled switches, such as SCR's or triacs, is that they are often susceptible to firing without the need for a separate firing signal when the change in applied voltage with respect to time is large. Such phenomenon is commonly known as the *dv/dt* or rate effect and is caused when the main switch is closed to its conductive position to instantaneously provide full voltage to the SCR or triac. False triggering of the controlled switch may be harmful to the main switch or to the load itself, especially if the latter draws heavy initial current transients, such as a tungsten load or lamp, a transformer or a discharged capacitor used, for example, in a DC power supply. Moreover, it is often important to assure that all firings of the SCR or triac will be synchronized with the trigger circuit, and a false start of the SCR or triac due to a voltage transient at the closing of the main circuit switch is likely to occur at a different point in the applied AC signal from the power supply than the point at which the firing signal from the adjustable trigger circuit is set.

By eliminating such transients in the control circuit when the main switch thereof is closed, the load current can be increased slowly in what is known as a soft start from a very low power condition to maximum power condition simply by advancing the trigger circuit control from a retarded firing angle after the line switch is closed. Previously expensive SCR or triac devices having high *dv/dt* capability or expensive and bulky resistor and capacitor snubber networks coupled across the SCR or triac have been used to reduce or to eliminate the false triggering of such controlled switches to avoid the above-mentioned and additional problems caused thereby.

SUMMARY OF THE INVENTION

The instant invention eliminates the false starting or firing of a controlled switch, such as an SCR or triac, by applying full line voltage across such controlled switch even when the main switch of the circuit is opened in its nonconductive state. The foregoing is accomplished by connecting a shunt resistance across the main switch of the circuit, whereby when such switch is open, line voltage is still applied across the controlled switch. The magnitude of the shunt resistance is determined by the normal leakage current through the controlled switch and the former must be small enough to supply sufficient leakage current to maintain substantially line voltage across the controlled switch and must be large enough to preclude operation of the load when the main switch is opened. Moreover, the shunt resistor limits circuit currents to safe values in the case of a faulty SCR.

Accordingly, a primary object of the invention is to provide a circuit improved in the noted respects.

Another object of the invention is to reduce and preferably to eliminate false starts or turn on of a controlled switch, such as an SCR, triac, or the like.

An additional object of the invention is to provide for soft starting of a load to avoid large current transients thereto.

A further object of the invention is to provide adequate leakage current to a controlled switch, such as an SCR or triac, in order to maintain full voltage thereacross when the main switch of a circuit controlled thereby is non-conductive.

Still another object of the invention is to indicate when a controlled switch in a circuit for controlling power to a load is faulty.

A primary advantage of the circuit is that it permits a soft start for an SCR or triac, which permits current flow through a load, while avoiding any *dv/dt* starts which might occur at any point in the cycle of the input AC power when the main switch of the circuit is initially closed, such closure possibly providing a transition from a no voltage to a high voltage across the SCR triac.

These and other objects and advantages of the present invention will become apparent as the following description proceeds.

To the accomplishment of the foregoing and related ends, the invention, then, comprises the features hereinafter fully described, the following description and the annexed drawing setting forth in detail certain illustrative embodiments of the invention, these being indicative, however, of but several of the various ways in which the principles of the invention may be employed.

DESCRIPTION OF THE PREFERRED EMBODIMENT

Figure 1:
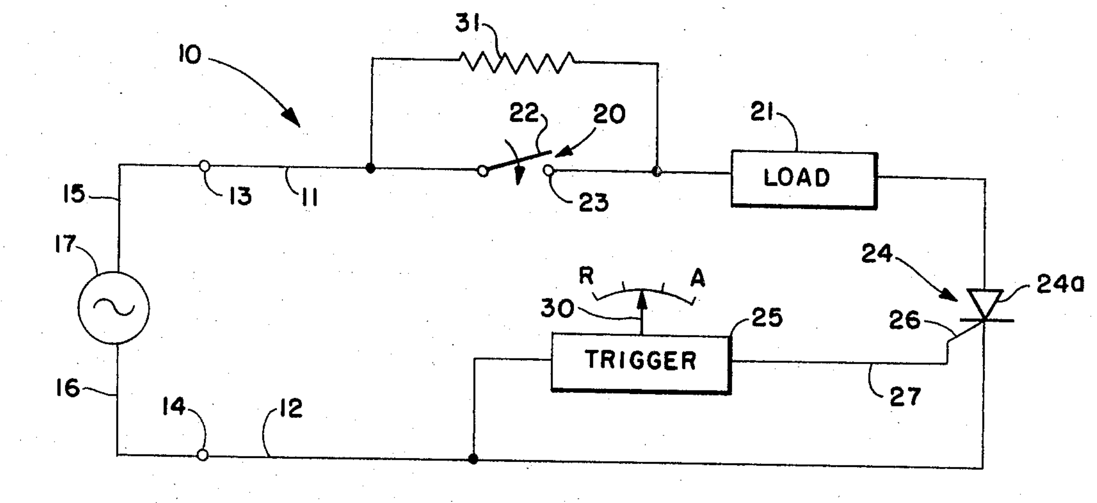
FIG. 1 is a schematic electric circuit diagram of the control circuit of the invention utilizing a silicon controlled rectifier.

Referring now to the drawing wherein like reference numerals refer to like elements in the several figures, and particularly to FIG. 1, a control circuit in accordance with the invention is generally indicated at 10. The control circuit 10 has respective input lines 11, 12 coupled at respective terminals 13, 14 to the output lines 15, 16 from an AC power supply 17. Although the latter device is illustrated as a distinct power supply, the input lines 11, 12 of the control circuit 10 may be coupled to a conventional electric plug which may be connected in a conventional electrical receptacle to receive AC power from the local power company or other AC source.

Coupled to the input line 11 is a main switch 20 for the control circuit 10, which may be a conventional mechanical switch, transistorized switch or the like, to provide power from the input lines to the load 21. The switch 20 includes a movable switch arm 22, which is shown in its open or non-conductive state and which may be closed to provide a connection with the fixed contact 23 in its conductive state. The primary consideration in selecting a main switch 20 is that in operation thereof upon closure to a conductive state line voltage from the AC power supply 17 can be provided immediately across the remainder of the control circuit 10.

Figure 2:
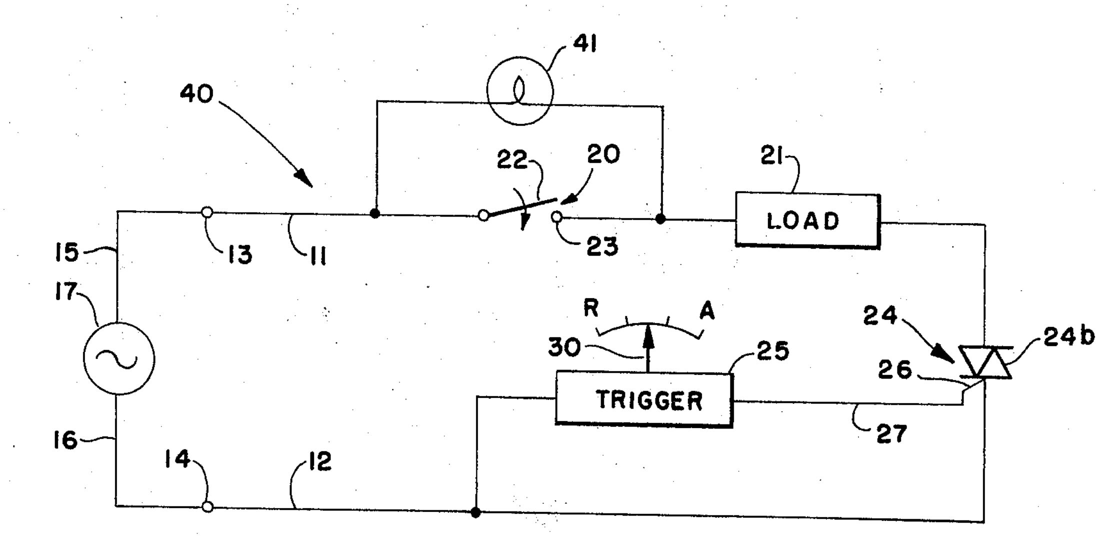
FIG. 2 is a schematic electric circuit diagram of the control circuit of the invention utilizing a triac.

The fixed contact 23 of the main switch 20 is connected in series with the load 21 and a controlled switch 24, such as the SCR 24*a* shown in FIG. 1 or the triac 24*b* shown in FIG. 2, and the controlled switch is in turn connected to the AC power supply 17 by the input line 12. The load 21 may be any type of load that operates when at least a minimum voltage and current is applied thereto, and may be in the form of a tungsten load, a transformer or a large capacitor, for example used in a DC power supply, each of such devices having a large current transient at the intial energization thereof, which current transient is capable of detrimental effects on other portions of the control circuit 10 as well as on elements to which the load 21 itself is connected.

A conventional trigger circuit 25 is connected to the gate electrode 26 of the SCR 24*a* to provide a trigger signal thereto on the line 27, and the trigger circuit is connected to the input line 12 of the control circuit 10 for reference to the signal provided by the latter AC power supply 17. Preferably, the trigger circuit 25 is adjustable, as indicated by the adjustable arm 30, which can be moved in known manner to the left to retard the trigger signal relative to the cyclical signal provided by the AC power supply 17 or to the right to advance the trigger signal relative to the power signal. Thus, the average power to the load 21 when the main switch 20 is closed can be determined by the angle or time during the AC power signal at which the SCR 24*a* is gated to conduction, whereby minimum power is provided to the load when the trigger signal is fully retarded and maximum power is applied to the load when the trigger signal is fully advanced.

A shunt resistance 31 is connected in electrical parallel relation across the main switch 20. The magnitude of the shunt resistance 31 is sufficiently great so that any current flow therethrough will be incapable of effecting operation of the load 21, yet is small enough so that such current flow when the main switch 20 is open will supply sufficient leakage current to the SCR 24*a* so that substantially line voltage is maintained thereacross. Thus, when the main switch 20 is closed to its conductive position there is no significant change in the voltage across the SCR 24*a* and spurious or false firing thereof by a large voltage transient applied between the anode and cathode of the SCR is avoided. The shunt resistance 31 may be a pure resistance element, or, if desired, a thermistor or similar device may be used. Moreover, a lamp may be used as the shunt resistance 31, as illustrated in FIG. 2.

The purpose of the control circuit 10 and particularly the shunt resistance 31 across the main switch 20 is to maintain the controlled switch 24, which may be an SCR or traic, under line voltage conditions at all times so that there is no transition to another voltage condition when the control circuit is energized by closure of the main switch 20. Although it is not necessary to have direct synchronization between the main switch 20 and the trigger circuit 30 for the SCR or triac, preferably in normal operation of the control circuit 10 the main switch 20 is closed when the trigger circuit 30 is in a low power condition, whereby the trigger signal provided thereby is substantially fully retarded.

Turning now more particularly to FIG. 2, the control circuit 40 includes similar elements as described with reference to FIG. 1. Thus, an AC power supply 17 provides AC power on the input lines 11, 12 of the control circuit, which can be energized by closure of the main switch 20. The shunt resistance 41 across the main switch is shown as a lamp, which has a relatively high resistance according to the criteria described above. The load 21 is connected in series with the main switch 20 and the controlled switch 24, which is a triac, and an adjustable trigger circuit 25 is connected to provide a trigger signal to the triac to effect conduction therein during each half cycle of the received AC power when the main switch 20 is closed. The leakage current through the triac 24*b* when the main switch 20 is open will normally be insufficient to illuminate the lamp; however, occurrence of such illumination provides an indication that the triac 24*b* is defective and conducting large currents although not properly triggered to conduction.

In either the FIG. 1 or FIG. 2 embodiments when the main switch 20 is open in the non-conductive state and power from the AC power supply is provided to the input lines 11, 12, a small current, which is insufficient to effect operation of the load 21 flows through the latter and through the shunt resistance 31 or 41 to the controlled switch 24, i.e., the SCR 24*a*, triac 24*b* or similar device, in order to maintain line voltage across such controlled switch 24. Closure of the main switch 20 in the control circuit 10 or 40 will not effect a large voltage transient across the controlled switch, and conduction therein will occur only when a trigger signal is applied to the gate thereof by the trigger circuit 25. Thus, false firing of the SCR 24*a* or triac 24*b* is avoided since the $dv/dt$ or rate effect conditions are eliminated from the control circuit 10 by the shunt resistance 31 or 41.

The SCR 24*a* will become conductive to permit current flow through the load 21 when the main switch 20 is closed whenever the anode thereof is more positive than the cathode and an appropriate trigger signal is received with conduction therein terminating as the anode goes negative with respect to the cathode. Similar operation occurs in the control circuit 40 illustrated in FIG. 2 when the triac 24*b* receives trigger signals from the trigger circuit 25 during each half cycle of the AC power supply, as is well known. Average power to the load can then be varied solely by adjustment of the trigger circuit 25.

It should now be understood that the circuit of the invention provides line voltage across a controlled switch in a control circuit without energizing the load therein so that upon closure of the main switch of the control circuit large voltage transients are avoided and false firing of the controlled switch is normally eliminated.

The embodiments of the invention in which an exclusive property or privilege is claimed are defined as follows:

1. A circuit for controlling power to a load, comprising input means for receiving power from a power supply, controlled switch means coupled relative to the load for controlling power thereto, main switch means capable of being in respective non-conductive and conductive states coupled to said input means for selectively providing operating power to the load and said controlled switch means when in the latter state, said main switch means, said controlled switch means and the load being electrically connected in series circuit relation, and means for applying substantially full voltage from the power supply to said controlled switch means when said main switch means is in such non-conductive state.

2. A circuit for controlling power to a load as set forth in claim 1, wherein the power supply provides an AC power to said input means, and further comprising trigger means coupled to said controlled switch means for normally effecting conduction in the latter during at least a portion of each cycle of said AC power when said main switch means is in such conductive state.

3. A circuit for controlling power to a load as set forth in claim 2, wherein said controlled switch means comprises a silicon controlled rectifier.

4. A circuit for controlling power to a load as set forth in claim 2, wherein said controlled switch means comprises a triac.

5. A circuit for controlling power to a load, comprising input means for receiving power from a power supply, controlled switch means coupled relative to the load for controlling power thereto, main switch means capable of being in respective non-conductive and conductive states coupled to said input means for selectively providing operating power to the load and said controlled switch means when in the latter state, and means for applying substantially full voltage from the power supply to said controlled switch means when said main switch means is in such non-conductive state, said means for applying comprising means for applying sufficient leakage current to said controlled switch means to maintain substantially full voltage across the latter when said main switch means is non-conductive, such leakage current being insufficient to operate the load.

6. A circuit for controlling power to a load as set forth in claim 5, wherein said means for applying is coupled in electrical parallel relation to said main switch means.

7. A circuit for controlling power to a load as set forth in claim 6, wherein said means for applying comprises a resistor.

8. A circuit for controlling power to a load as set forth in claim 6, wherein said means for applying comprises a lamp, whereby illumination of said lamp when said main switch means is non-conductive indicates a fault in said controlled switch means.

9. A circuit for controlling power to a load as set forth in claim 6, wherein said means for applying comprises a thermistor.

10. A circuit for controlling power to a load as set forth in claim 5, wherein the power supply provides AC power to said input means, and further comprising trigger means coupled to said controlled switch means for normally effecting conduction in the latter during at least a portion of each cycle of said AC power, said trigger means being adjustable for retarding or advancing the point in each cycle of said AC power at which said controlled switch means becomes conductive to determine the average operating power provided to the load when said main switch means is in such conductive state.

11. A circuit for controlling power to a load as set forth in claim 10, wherein said controlled switch means is coupled in series with the load and said means for applying is coupled in electrical parallel relative to said main switch means.

* * * * *